United States Patent
Sakaguchi

(10) Patent No.: US 8,294,799 B2
(45) Date of Patent: Oct. 23, 2012

(54) SOLID-STATE IMAGING APPARATUS

(75) Inventor: Naofumi Sakaguchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 558 days.

(21) Appl. No.: 12/479,005

(22) Filed: Jun. 5, 2009

(65) Prior Publication Data

US 2009/0303367 A1    Dec. 10, 2009

(30) Foreign Application Priority Data

Jun. 9, 2008   (JP) ................... 2008-150052

(51) Int. Cl.
*H04N 3/14* (2006.01)
*H04N 5/335* (2011.01)

(52) U.S. Cl. .............. 348/302; 348/294; 348/319

(58) Field of Classification Search .......... 348/302, 348/319
See application file for complete search history.

(56) References Cited

U.S. PATENT DOCUMENTS

| | | | | | |
|---|---|---|---|---|---|
| 5,894,325 | A | * | 4/1999 | Yonemoto | 348/302 |
| 7,012,635 | B2 | * | 3/2006 | Umeda et al. | 348/208.4 |
| 7,471,230 | B2 | * | 12/2008 | Tooyama et al. | 341/164 |
| 7,903,161 | B2 | * | 3/2011 | Ota | 348/308 |
| 2003/0062583 | A1 | * | 4/2003 | Miyatake | 257/443 |
| 2006/0007334 | A1 | * | 1/2006 | Mabuchi | 348/296 |

FOREIGN PATENT DOCUMENTS

| JP | 2005-176105 A | 6/2005 |
|---|---|---|
| WO | WO 2007/043252 | * 4/2007 |

* cited by examiner

*Primary Examiner* — Jordan Schwartz
(74) *Attorney, Agent, or Firm* — Westerman, Hattori, Daniels & Adrian, LLP

(57) ABSTRACT

A solid-state imaging apparatus including: a pixel section having two-dimensionally arranged pixels each containing a photoelectric conversion device for converting a light signal into a signal electric charge and accumulating the signal electric charge, an amplification means for amplifying and outputting as a pixel signal the signal electric charges accumulated at the photoelectric conversion device, a transfer means for transferring the accumulated signal electric charges to the amplification means, and a reset means for resetting the signal electric charges; a vertical scanning section for outputting a vertical scanning signal to drive/control the pixel section row by row; and a vertical selecting section for generating a row transfer signal in accordance with the vertical scanning signal to drive the transfer means and for generating a row reset signal having a falling edge delayed by a predetermined amount from the row transfer signal to drive the reset means.

2 Claims, 14 Drawing Sheets

SOLID-STATE IMAGING APPARATUS

This application claims benefit of Japanese Patent Application No. 2008-150052 filed in Japan on Jun. 9, 2008, the contents of which are incorporated by this reference.

BACKGROUND OF THE INVENTION

The present invention relates to solid-state imaging apparatus, and more particularly relates to the solid-state imaging apparatus in which pixels can be reset at high speed.

A fundamental construction and drive method of a prior-art MOS type solid-state imaging apparatus will first be described by way of FIGS. 1, 2, 3, 4, and 5. FIG. 1 shows a pixel construction used in the MOS solid-state imaging apparatus. What is denoted by a numeral 100 in FIG. 1 is a unit pixel a plurality of which are two-dimensionally arranged into a matrix to acquire image information. The unit pixel 100 includes: a photodiode 101 for effecting photoelectric conversion; an amplification transistor 104 where a photo-generated electric charge occurring at the photodiode 101 is converted into a voltage and is read out as it is amplified for example by means of a pn junction capacitor or gate capacitor; a transfer transistor 102 for transferring the photo-generated electric charge occurring at the photodiode 101 to a gate terminal of the amplification transistor 104; a reset transistor 103 for resetting the gate terminal of the amplification transistor 104 and the photodiode 101; and a select transistor 105 for selecting the pixel so as to transmit an output of the amplification transistor 104 to a vertical signal line 110.

Here, all components but the photodiode 101 are shielded from light.

What is denoted by a numeral 106 is a pixel power supply line for supplying power to all the pixels in common, which is electrically connected to the drain terminal of the amplification transistor 104 and to the drain terminal of the reset transistor 103. 107 is a row reset line for resetting pixels corresponding to one row, which is electrically connected respectively to the gate terminal of the reset transistor 103 of the pixels corresponding to one row. 108 is a row transfer line for transferring the photo-generated electric charge of the pixels corresponding to one row to the gate terminal of the amplification transistor 104 of the respective pixel, which is electrically connected respectively to the gate terminal of each transfer transistor 102 of the pixels corresponding to one row. 109 is a row select line for selecting the pixels corresponding to one row, which is electrically connected respectively to the gate terminal of each select transistor 105 of the pixels corresponding to one row. A photoelectric conversion function, a reset function, a memory function, an amplification/read function, a select function are achieved with such pixel construction.

FIG. 2 typically represents a fundamental construction of the MOS solid-state imaging apparatus. In FIG. 2, a numeral 200 represents a pixel section where unit pixels 100 are two-dimensionally arranged into a matrix that corresponds to pixels P11 to P33. For ease of explanation, the unit pixels 100 in this case are placed side by side into 3 rows by 3 columns. 202 represents a vertical scanning circuit for effecting row selection, which sequentially outputs a vertical scanning signal φ VSR(i) (i=1, 2, 3). 203 represents a vertical selecting section which is to respectively transmit a row select signal φ SE(i) (i=1, 2, 3), a row reset signal φ RS(i) (i=1, 2, 3), and a row transfer signal φ TR(i) (i=1, 2, 3) to the row select line 109, the row reset line 107, and the row transfer line 108 of each pixel P11 to P33 in accordance with the vertical scanning signal φ VSR(i). While in FIG. 2, the lines for transmitting the row select signal φ SE, the row reset signal φ RS, and the row transfer signal φ TR to each row are indicated by one solid line and the outputs of vertical select circuits (MV1, MV2, MV3) of the vertical selecting section 203 are indicated by one solid line for each row, these in actual setting are respectively provided as a number of lines that are independent from each other.

FIG. 3 shows a specific construction of the vertical select circuit (MV1, MV2, MV3) in the vertical selecting section 203. Referring to FIG. 3, 202 is the vertical scanning circuit, and φ SE, φ RS, φ TR are the row select signal, row reset signal, and row transfer signal, respectively. A signal φ SE(i) (i=1, 2, 3) taking AND of the vertical scanning signal φ VSR(i) (i=1, 2, 3) outputted from the vertical scanning circuit 202 and the row select signal φ SE is connected to the row select line 109 in the pixel section 200; a signal φ RS(i) (i=1, 2, 3) taking AND of the vertical scanning signal φ VSR(i) (i=1, 2, 3) and the row reset signal φ RS is connected to the row reset line 107 in the pixel section 200; and a signal φ TR(i) (i=1, 2, 3) taking AND of the vertical scanning signal φ VSR(i) (i=1, 2, 3) and the row transfer signal φ TR is connected to the row transfer line 108 in the pixel section 200.

Referring to FIG. 2, 201 represents a current supply section where current supply ML1, ML2, ML3 provided column by column and the vertical signal line 110 as described in FIG. 1 are respectively connected. A source follower circuit is thereby formed column by column with the amplification transistor 104 of each pixel and the current supply ML1 to ML3. Here the current supply ML1 to ML3 has a function for causing a flow of constant bias current.

Referring to FIG. 2, 204 represents a column processing circuit section where pixel signals outputted from the above described source follower circuits are respectively subjected to correlation double sampling (CDS) by means of column processing circuit CDS1, CDS2, CDS3 provided for each column whereby signal processing is effected for example to remove such offset variance as fixed pattern noise of pixel, and then a result of the signal processing is stored. 205 represents a horizontal scanning circuit for effecting column selection from which horizontal scanning signals φ HSR(j) (j=1, 2, 3) are sequentially outputted. 206 represents a horizontal select switch section where the signal processing result stored at the column processing circuit section 204 is transmitted to the horizontal signal line 207 in accordance with the horizontal scanning signal φ HSR(J) (j=1, 2, 3). 208 represents an amplifier for amplifying and outputting to the outside the signal processing result stored at the column processing circuit 204 which has been transmitted to the horizontal signal line 207.

A drive timing at the time of taking moving picture with thus constructed MOS solid-state imaging apparatus will now be described by way of a timing chart in FIG. 4. When the vertical scanning signal of the first row φ VSR(1) is outputted from the vertical scanning circuit 202, the pixels in the first row are made drivable. More particularly, for the pixels of the first row, the row select signal φ SE may be transmitted to the gate terminal of the select transistor 105 of the first row pixels as the select signal of the first row φ SE(1) through the vertical select circuit MV1 and the row select line 109. Further, the row reset signal φ RS may be transmitted to the gate terminal of the reset transistor 103 of the first row pixels as the reset signal of the first row φ RS(1) through the vertical select circuit MV1 and the row reset line 107. Furthermore, the row transfer signal φ TR may be transmitted to the gate terminal of the transfer transistor 102 of the first row pixels as the transfer signal of the first row φ TR(1) through the vertical select circuit MV1 and the row transfer line 108.

An operation in period Tv will first be described. When the vertical scanning signal φ VSR(1) attains "H" level and then the row select signal φ SE(1) attains "H" level, an output of the amplification transistor 104 may be transmitted onto the vertical signal line 110. In other words, a period for effecting reading of signal and processing of signal is started. Next, when the row reset signal φ RS(1) attains "H" level, the gate terminal of the amplification transistor 104 is reset to the level of a pixel power supply VDD. Next, the row reset signal φ RS(1) is brought to "L" level so that a reset level output outputted from the amplification transistor 104 at this time is sampled at the column processing circuit section 204.

Next, the row transfer signal φ TR(1) is driven to "H" level to transfer photo-generated electric charges accumulated at the photodiode 101 are transferred to the gate terminal of the amplification transistor 104. The row transfer signal φ TR(1) is then brought to "L" level to sample again at the column processing circuit section 204 a signal level output outputted at this time. Subsequently at the column processing circuit section 204, a differential processing between the sampled signal level output and reset level output is performed and the signals after the differential processing are stored respectively at the column processing circuits CDS1, CDS2, and CDS3. The row select signal φ SE(1) is then brought to "L" level whereby the period for effecting signal read and signal processing is ended. When transfer of the photo-generated electric charges accumulated at the photodiode 101 to the gate terminal of the amplification transistor 104 is complete, the photodiode 101 is reset and an accumulation of photo-generated electric charge is started at the photodiode 101.

An operation in period Th will next be described. When the horizontal scanning signal φ HSR(j) (j=1, 2, 3) is sequentially outputted from the horizontal scanning circuit 205, the signals after the differential processing stored at the column processing circuits CDS1, CDS2, CDS3 in the column processing circuit section 204 are sequentially read out onto the horizontal signal line 207 respectively through horizontal select switches MH1, MH2, and MH3 in the horizontal select switch section 206. The signals read out onto the horizontal signal line 207 are amplified at the output amplifier 208 and are outputted to the outside. The signal to be outputted to the outside is shown as Vout in FIG. 4. At this time, a suitable bias current in accordance with signal band is supplied to the output amplifier section 208.

Signals of the pixels corresponding to one row are read out with the above operation. By sequentially effecting this operation from the first row to the third row, signals of all the pixels in the pixel section 200 can be read out. In particular, the pixel signals of the pixels P11 to P33 in the light receiving pixel section 200 are sequentially outputted as Vout from the output amplifier section 208. The periods of the above constitute 1 frame period Tf which in this description, corresponds to an accumulation period of photo-generated electric charge at the photodiode 101.

A description will next be given with respect to case where a still picture is taken with using the solid-state imaging apparatus shown in FIG. 2. In the still picture taking, a mechanical shutter is used to determine an exposure time. In the operation at the time of still picture taking, all pixels are reset (initial reset) in a condition shielded from light by closing the mechanical shutter, and an exposure is subsequently started by opening a first blind of the mechanical shutter. After passage of a desired time, then, light is cut off by closing a second blind of the mechanical shutter so as to end the exposure.

After the end of the exposure, a read operation is rendered.

In transition to the still picture taking from a moving picture taking for example in a live view mode, since the mechanical shutter is always opened at the time of taking moving picture, the mechanical shutter must be closed once and a time lag in the transition is inevitable with the above described method for determining exposure where mechanical shutter is used. In recent years, there is thus provided a method in which an exposure is started by reset operation (initial reset) of the solid-state imaging apparatus to eliminate the time lag in the transition, and the exposure is ended by a mechanical shutter. This method will be referred to hereinafter as first blind electronic shutter. In the first blind electronic shutter operation, it is necessary to perform an initial reset operation and an operation of the mechanical shutter at the same speed so as to match the exposure time between the upper and lower sides of an image. At this time, since mechanical shutter operates at such a high speed as several ms, the initial reset operation must also be performed at a high speed in several ms.

FIG. 5 is a timing chart showing drive timing at the time of still picture taking with using the first blind electronic shutter. When the vertical scanning signal of the first row φ VSR(1) is outputted from the vertical scanning circuit 202, the first row pixels are made drivable. When the vertical scan signal φ VSR(1) attains "H" level and then the row reset signal φ RS(1) attains "H" level, the reset transistors 103 of the pixels corresponding to one row are turned ON. Next, when the row transfer signal φ TR(1) attains "H" level, the photodiodes 101 of the first row attain the power supply voltage VDD whereby the photodiodes 101 are reset and an exposure is started. The second row and after are treated in like manner. After passage of a desired time, then, the exposure is ended by closing the mechanical shutter and signals are read out. The reading of the signals is similar to the signal read operation described in FIG. 4. In the still picture taking, however, since light is cut off at the time of reading, an exposure is not started even after the transferring of photo-generated electric charge is ended.

At the time of initial reset in first blind electronic shutter operation, while the initial reset operation is rendered as shown in FIG. 5 as the reset operation alone is sequentially effected on each row, an initial reset period becomes longer when the number of rows is increased with an increase in the number of pixels; it becomes impossible to meet the mechanical shutter operation.

To make the initial reset operation correspond to the mechanical shutter operation, therefore, the vertical selecting operation must be rendered at a high speed.

Further, a method has been disclosed in Japanese Patent Application Laid-Open 2005-176105 as the method for performing a high-speed initial reset operation. In the method, a plurality of rows is simultaneously reset and this is repeated to achieve the high-speed initial reset operation.

SUMMARY OF THE INVENTION

In a first aspect of the invention, there is provided a solid-state imaging apparatus including: a pixel section having two-dimensionally arranged pixels each containing a photoelectric conversion device for converting a light signal into a signal electric charge and accumulating the signal electric charge, an amplification means for amplifying and outputting as a pixel signal the signal electric charges accumulated at the photoelectric conversion device, a transfer means for transferring the accumulated signal electric charges to the amplification means, and a reset means for resetting the signal electric charges; a vertical scanning section for outputting a vertical scanning signal to drive/control the pixel section row by row; and a vertical selecting section for generating a row transfer signal in accordance with the vertical scanning signal to drive the transfer means and for generating a row reset signal having a falling edge delayed by a predetermined amount from the row transfer signal to drive the reset means.

In a second aspect of the invention, the row reset signal in the solid-state imaging apparatus according to the first aspect is generated with delaying the whole of the transfer signal.

In a third aspect of the invention, the solid-state imaging apparatus according to the first aspect further includes a control section for, in a still image taking to be performed with the step of sequentially outputting the pixel signal row by row after passage of a desired exposure period subsequently to an initial reset operation where reset operation alone is sequentially performed row by row of the pixels in the pixel section, effecting a control so that the row transfer signal and the row reset signal are generated at the time of the initial reset operation.

DESCRIPTION OF THE PREFERRED EMBODIMENTS

Some embodiments of the solid-state imaging apparatus according to the invention will be described below with reference to the drawings.

(Embodiment 1)

Figure 1:
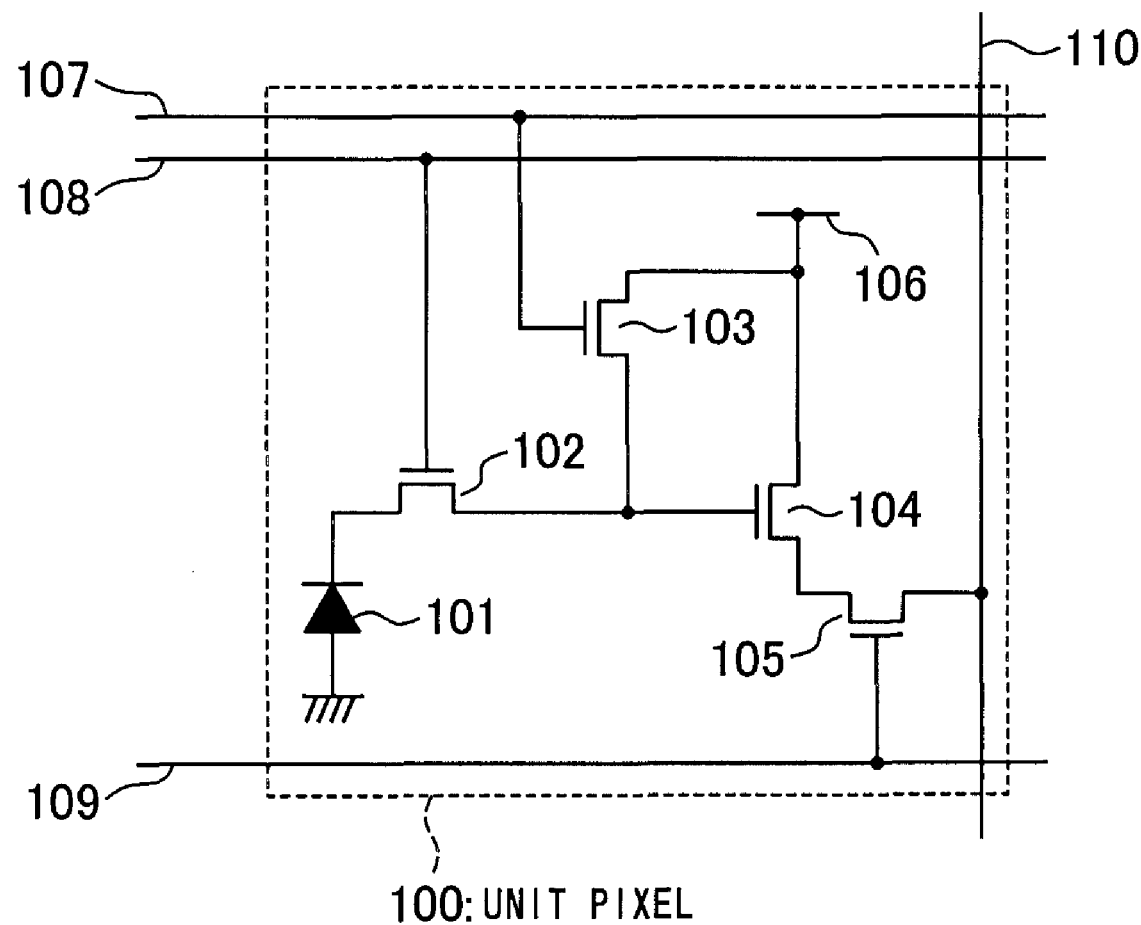
FIG. 1 is a circuit diagram showing a general pixel construction to be used in MOS solid-state imaging apparatus.
Figure 2:
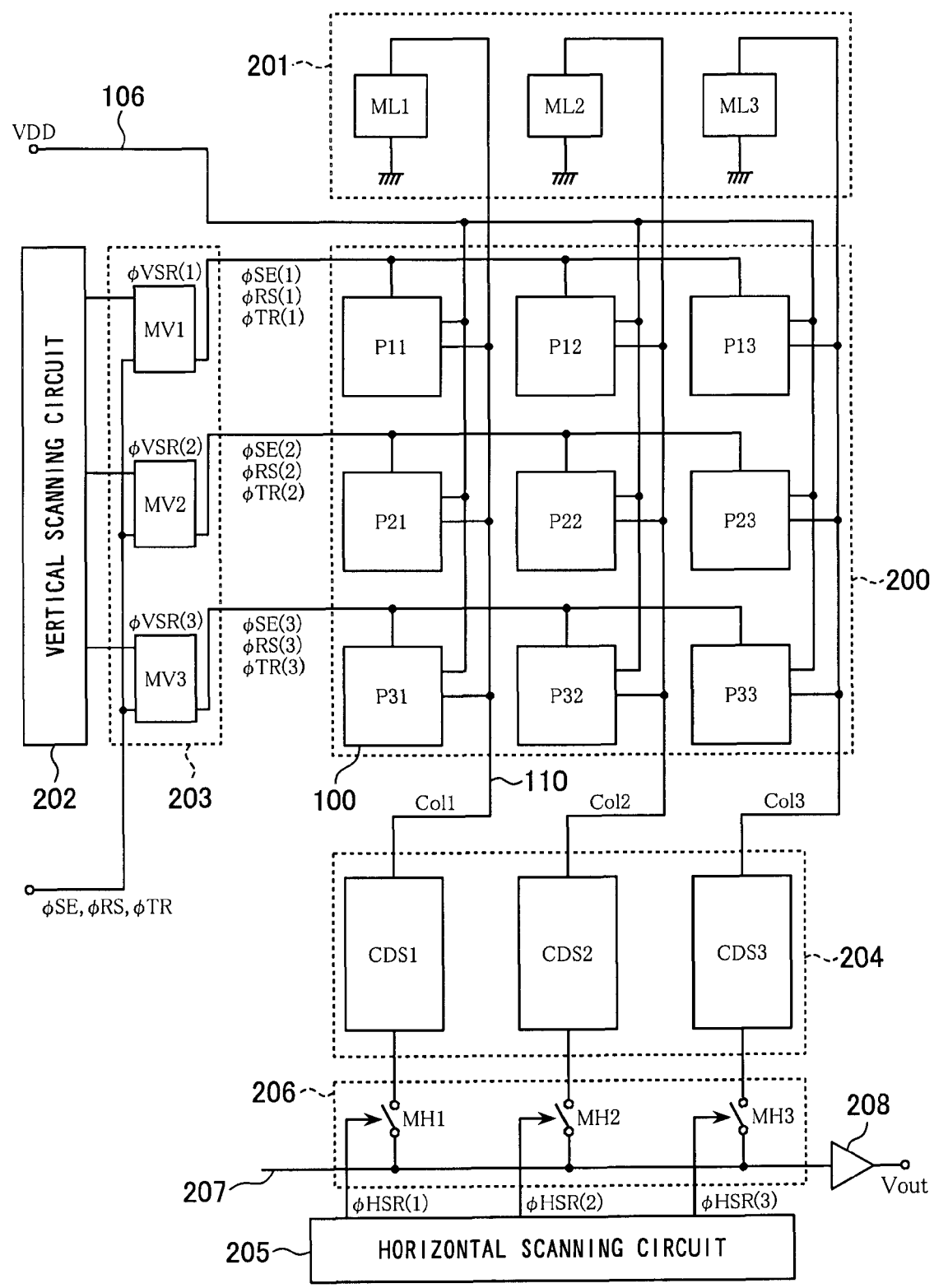
FIG. 2 is a block diagram showing a fundamental construction of MOS solid-state imaging apparatus.
Figure 3:
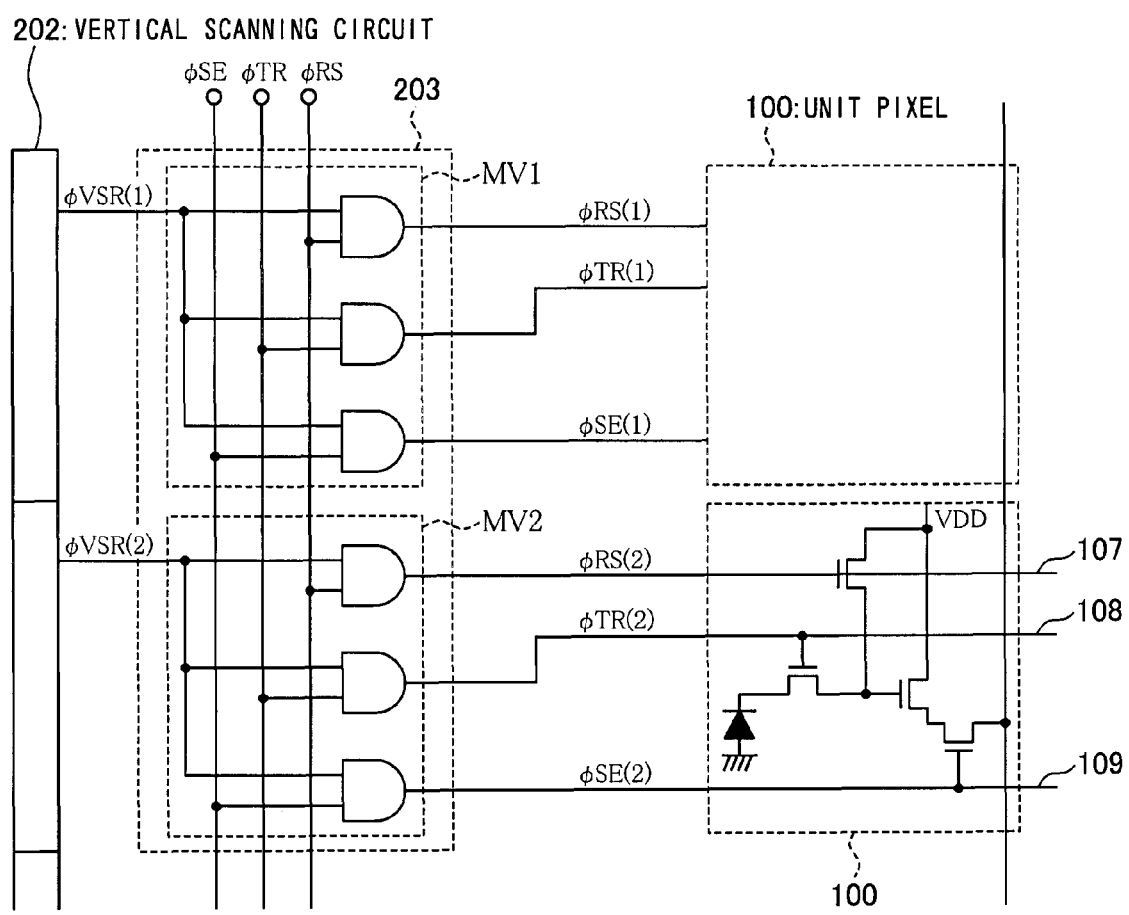
FIG. 3 is a circuit diagram showing a specific construction of the vertical select circuit in the MOS solid-state imaging apparatus shown in FIG. 2.
Figure 6:
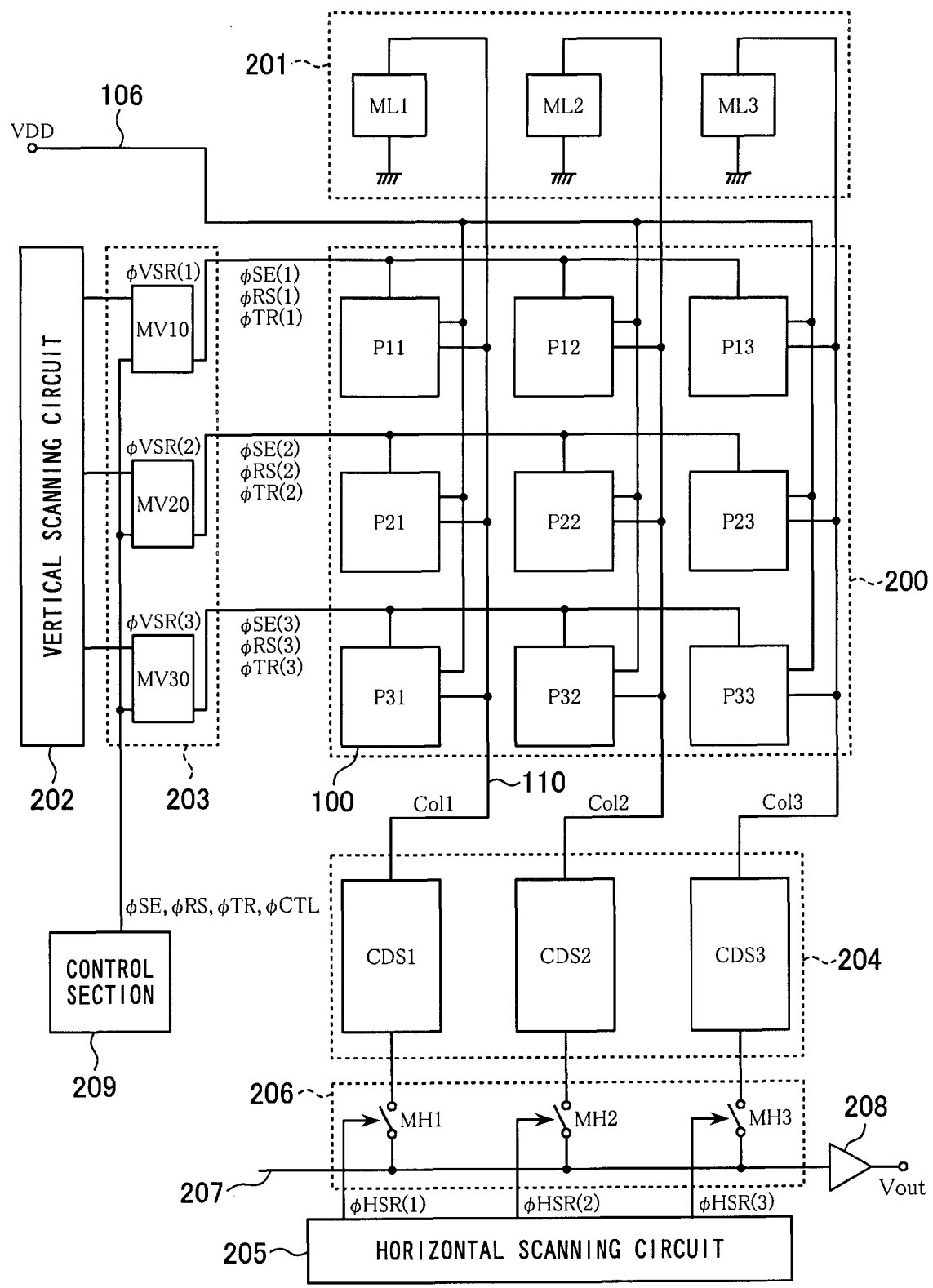
FIG. 6 is a block diagram showing an entire construction of the first embodiment of the solid-state imaging apparatus according to the invention.
Figure 7:
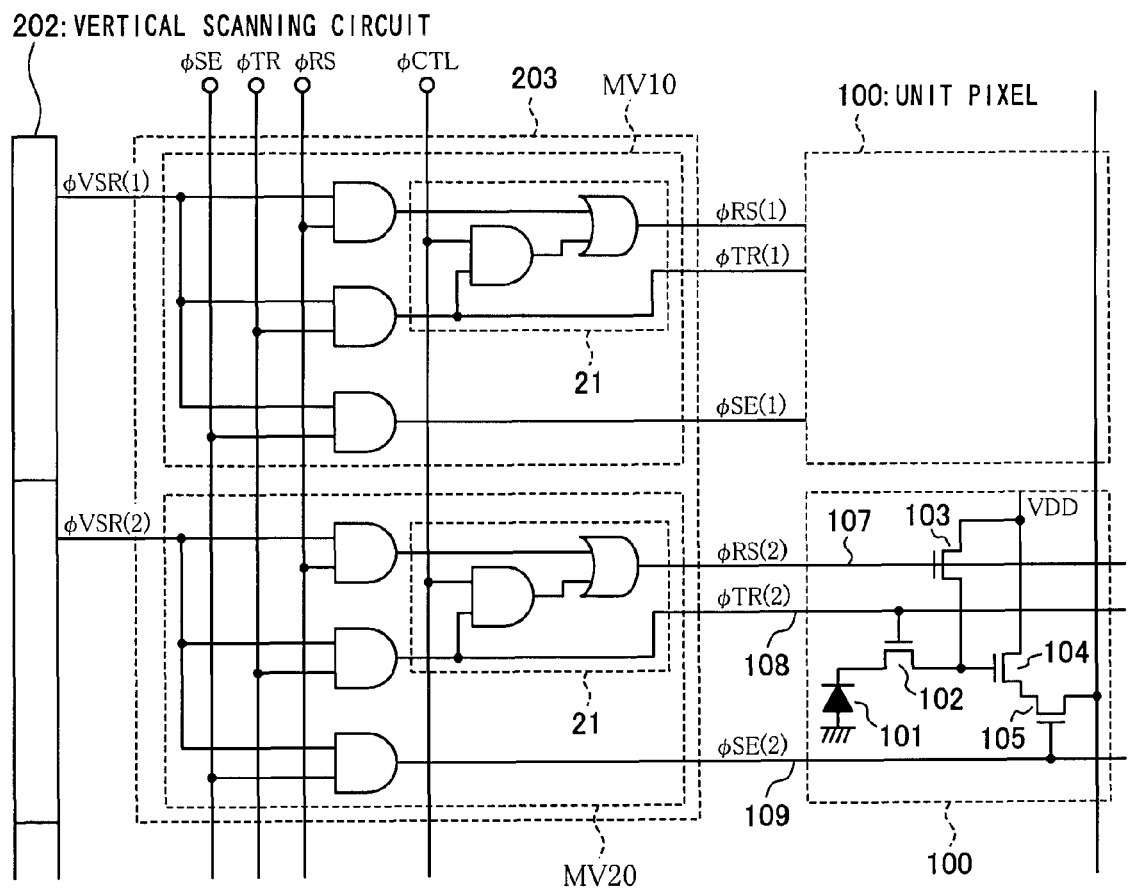
FIG. 7 is a circuit diagram showing a specific construction of a portion of the vertical select circuit and the pixel in the first embodiment shown in FIG. 6.

A first embodiment of the solid-state imaging apparatus according to the invention will now be described by way of FIGS. 6, 7, 8, and 9. This embodiment corresponds to the first to third aspects of the invention. FIG. 6 is a block diagram showing construction of the solid-state imaging apparatus as a whole according to the first embodiment. The solid-state imaging apparatus according to this embodiment has a construction identical to the prior-art example shown in FIG. 2 but the construction of vertical select circuits MV10, MV20, MV30 of the vertical selecting section 203 and that a control section 209 for controlling these is provided. Its description on the whole will be omitted. FIG. 7 is a circuit diagram showing a specific construction of the vertical select circuit (MV10, MV20, MV30). Since the pixels used here are identical to those in the prior-art example shown in FIG. 1, the pixel construction will not be described.

Referring to FIG. 7, 202 is a vertical scanning circuit for sequentially outputting a vertical scanning signal φ VSR(i) (i=1, 2, 3). φ SE, φ RS, φ TR, and φ CTL are a row select signal, a row reset signal, a row transfer signal, and delay circuit control signal for controlling a delay circuit 21, respectively; these signals are controlled by the control section 209. A signal φ SE(i) (i=1, 2, 3) taking AND of the vertical scanning signal φ VSR(i) (i=1, 2, 3) outputted from the vertical scanning circuit 202 and the row select signal φ SE is connected to the row select line 109 in the pixel section 200. A signal φ TR(i) (i=1, 2, 3) taking AND of the vertical scanning signal φ VSR(i) (i=1, 2, 3) and the row transfer signal φ TR is connected to the row transfer line 108 in the pixel section. Further, a signal φ RS(i) (i=1, 2, 3) is generated by taking OR of a signal taking AND of the vertical scanning signal φ VSR(i) (i=1, 2, 3) outputted from the vertical scanning circuit 202 and the row reset signal φ RS or a signal taking AND of the delay circuit control signal φ CTL and the transfer signal of i-th row i φ TR(i) (i=1, 2, 3); the signal φ RS(i) (i=1, 2, 3) is connected to the row reset line 107 in the pixel section 200. While the delay circuit 21 is shown as constituted of AND circuit and OR circuit, it may also be constructed for example with using switches, delay devices, etc.

Figure 8:
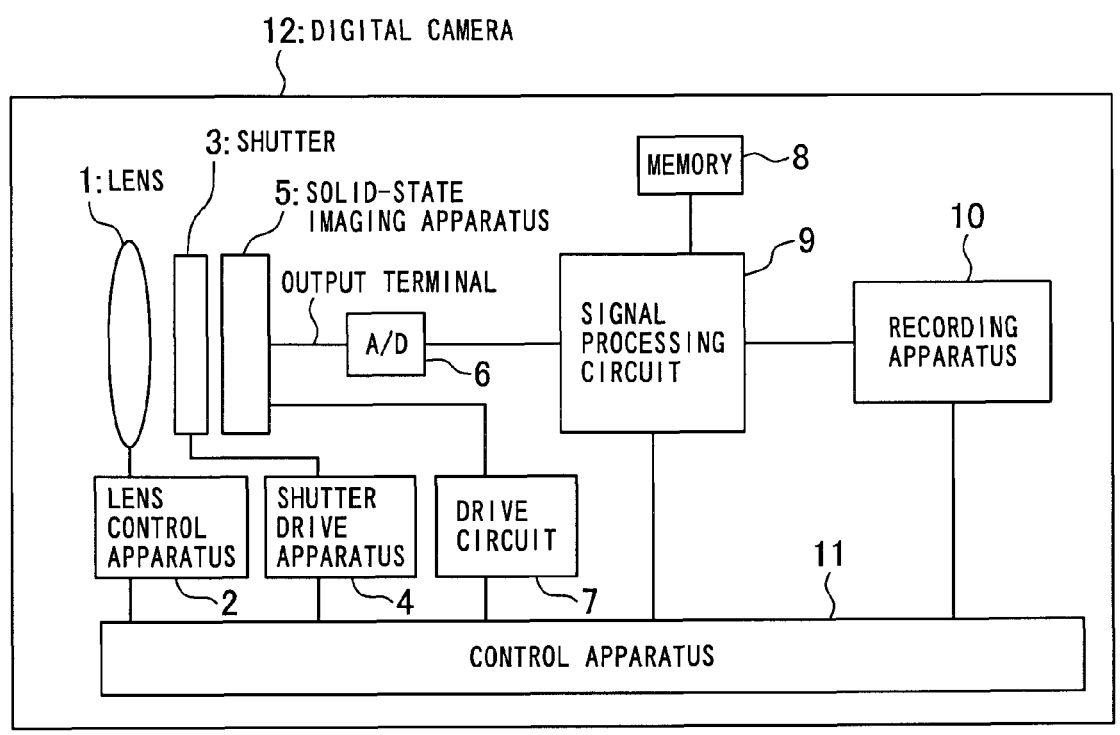
FIG. 8 is a block diagram showing construction of a digital camera using the solid-state imaging apparatus according to the first embodiment shown in FIGS. 6 and 7.

A construction of digital camera will now be described by way of FIG. 8 with respect to a case where the solid-state imaging apparatus according to the first embodiment constructed as the above is applied to the digital camera. Referring to FIG. 8, 1 is a lens section for forming object image on a solid-state imaging apparatus 5. At the lens section 1, zoom, focus, and aperture are driven and controlled by a lens control apparatus 2. 3 is a shutter serving as a light-shielding member, which in this case is a focal-plane type shutter mechanism to be used in the so-called single lens reflex camera. The shutter 3 is driven and controlled by a shutter drive apparatus 4. 5 is the solid-state imaging apparatus having construction as shown in FIG. 6 where object formed into an image at the lens section 1 is taken in as image signal.

Further, 6 is an A/D conversion section for converting signal outputted from an output terminal of the solid-state imaging apparatus 5 into a digital signal; and 9 is an imaging signal processing circuit for rendering various types of processing on the signal outputted from the A/D conversion section 6. Amplification of image signal, various types of correction on image data, compression of image data, etc. are effected at the imaging signal processing circuit 9. 7 is a drive circuit for driving and controlling the solid-state imaging apparatus 5; 11 is a control apparatus for controlling the digital camera as whole; 8 is a memory section for temporarily storing image data; and 10 is an attachable/detachable recording medium such as of semiconductor memory for recording or reading image data.

Figure 9:
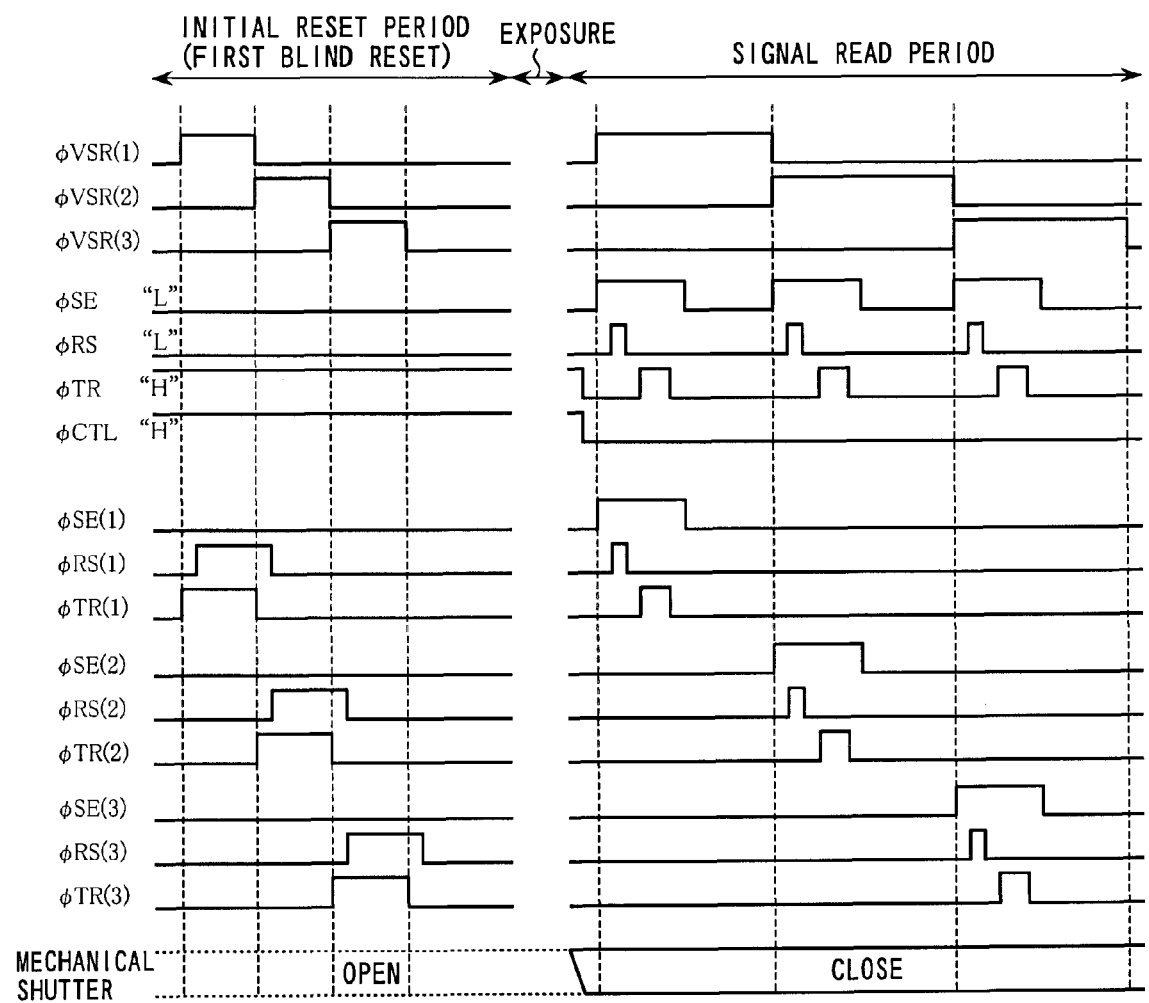
FIG. 9 is a timing chart for explaining an operation at the time of taking still picture with using a first blind electronic shutter in the digital camera shown in FIG. 8.

An operation at the time of taking still picture with using the first blind electronic shutter in the digital camera having the above construction will be described below by way of a timing chart in FIG. 9. At the time of initial reset, the row select signal φ SE and the row reset signal φ RS are continuously at "L" level, and the row transfer signal φ TR and the delay circuit control signal φ CTL are continuously at "H" level. When the vertical scanning signal of the first row φ VSR(1) is outputted from the vertical scanning circuit 202, the pixels of the first row are made drivable. When the vertical scan signal φ VSR(1) attains "H" level, the transfer signal of the first row φ TR(1) becomes a signal like the vertical scanning signal φ VSR(1) because the row transfer signal φ TR is at "H" level. Since the row reset signal φ RS is continuously at "L" level, the signal taking AND of the vertical scanning signal φ VSR(1) and the row reset signal φ RS attains "L" level.

Further, since the delay circuit control signal φ CTL is continuously at "H" level, the signal taking AND of the first row transfer signal φ TR(1) and the delay circuit control signal φ CTL is a signal like the first row transfer signal φ TR(1). Accordingly, since the reset signal of the first row φ RS(1) becomes a signal taking OR of its "L" level or the row transfer signal of the first row φ TR(1), the first row reset signal φ RS(1) becomes a signal like the first row transfer signal φ TR(1). The timing of the first row reset signal φ RS(1), however, occurs as it is delayed correspondingly to the fact that it goes through the delay circuit 21 where AND and OR are taken as compared to the first row transfer signal φ TR(1). An accumulation of photo-generated electric charge at the pixels of the first row is started from a point in time when the reset signal of the first row φ RS(1) is changed from "H" level to "L" level. After passage of a desired time, then, the accumulation is ended as the mechanical shutter is closed to cut off an incident light. The second row and after are treated in like manner.

Figure 4:
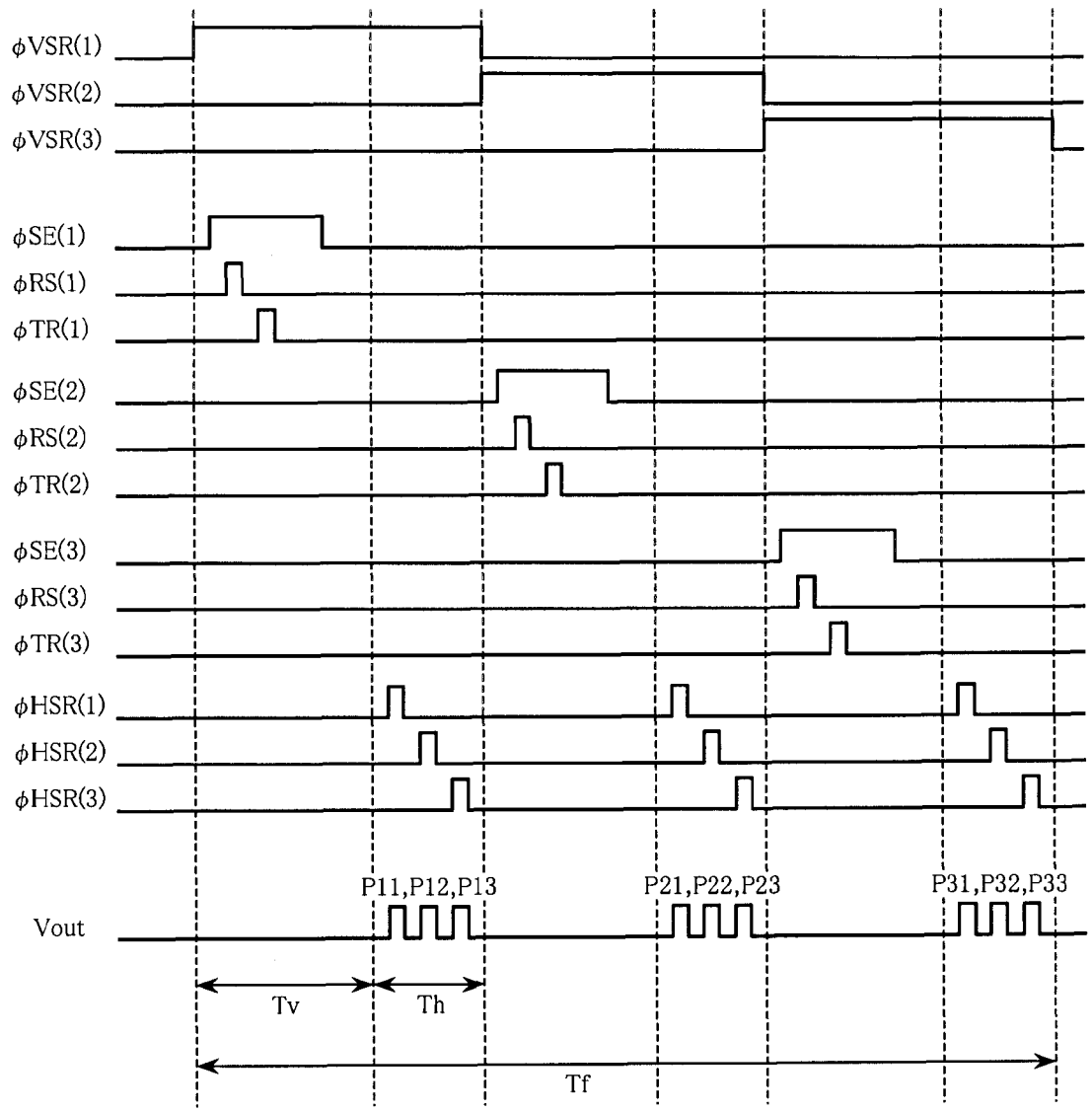
FIG. 4 is a timing chart for explaining an operation at the time of taking moving picture with the MOS solid-state imaging apparatus shown in FIGS. 2 and 3.
Figure 5:
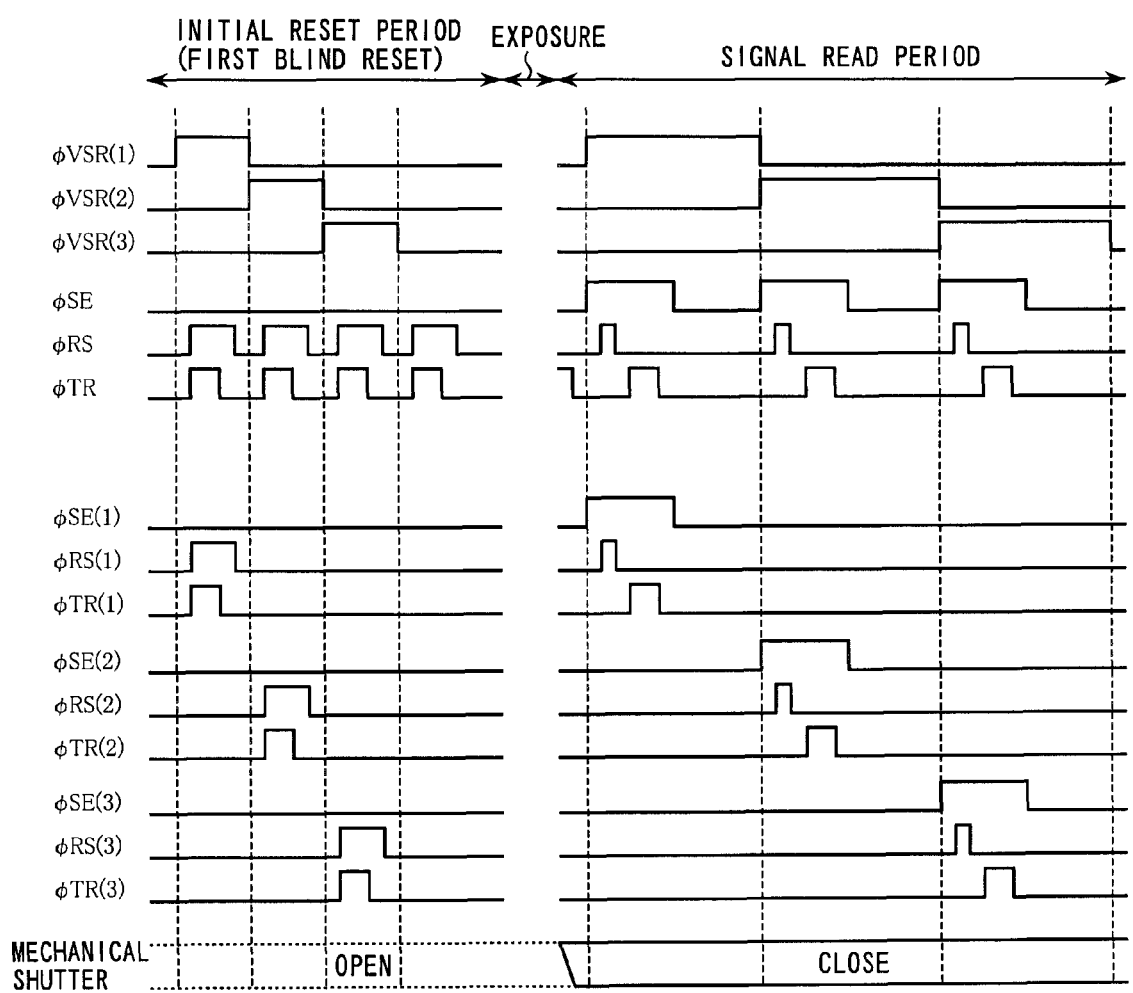
FIG. 5 is a timing chart for explaining an operation at the time of taking still picture with using a first blind electronic shutter in the MOS solid-state imaging apparatus shown in FIGS. 2 and 3.

A signal read operation at the time of this still picture taking is similar to the signal read operation in the prior-art example described in FIG. 4. At the time of taking a still picture, however, an exposure is not started even after the transferring of photo-generated electric charge is ended because light is cut off when the signal is read out.

Thus, the solid-state imaging apparatus having the above described construction is used to generate a transfer signal from the vertical scanning signal, and the transfer signal is delayed to generate a reset signal. Since it is thus not necessary to make allowance for timing margin between the signals and since a sequential reset is ended row by row, a high-speed initial reset becomes possible without causing exposure unevenness in image. Accordingly, the solid-state imaging apparatus may be achieved as capable of meeting a high-speed mechanical shutter operation.

(Embodiment 2)

Figure 10:
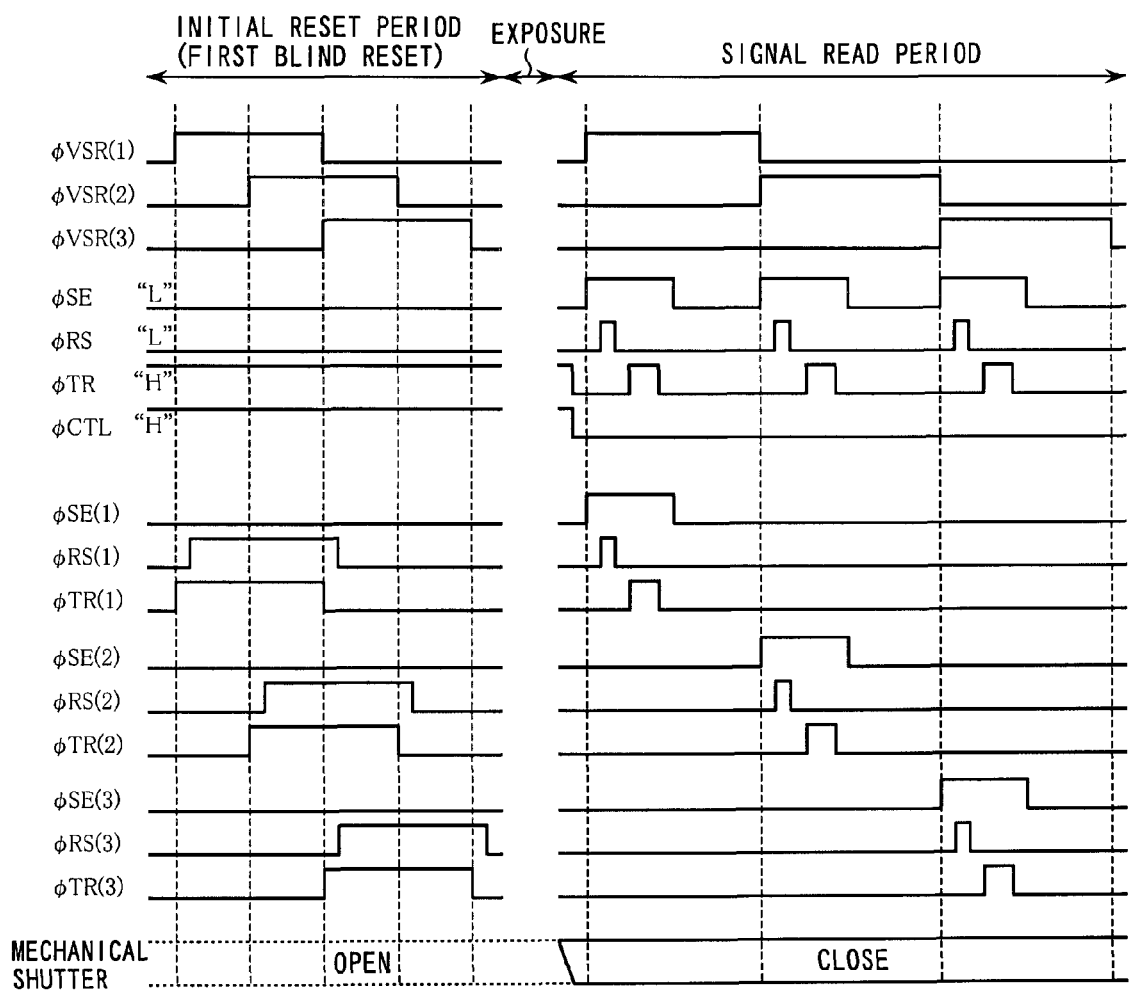
FIG. 10 is a timing chart for explaining a drive operation in a second embodiment.

A second embodiment of the invention will now be described by way of FIG. 10. This embodiment also corresponds to the first to third aspects of the invention.

The construction of the solid-state imaging apparatus in this embodiment itself is identical to the first embodiment shown in FIG. 6. With the present embodiment, the drive in the first embodiment is so adapted that resetting is more securely effected. FIG. 10 shows a timing chart in the case where a reset time of each row at the time of initial reset is made longer in the solid-state imaging apparatus used in the first embodiment. As shown in FIG. 10, when time twice that in the first embodiment shown in FIG. 9 is provided as the period during which the vertical scanning signal φ VSR is at "H" level, the periods during which the row transfer signal of i-th row φ TR(i) (i=1, 2, 3) and the row reset signal of i-th row φ RS(i) are at "H" level are similarly provided as twice the time shown in FIG. 9.

In this manner, it is possible to reset more securely by providing a longer period during which the vertical scanning signal φ VSR contributing to the resetting is at "H" level. Further, the interval of reset end timing, i.e. timing for starting exposure between each row is equal to the interval between each row of the timing at which the vertical scanning signal φ VSR attains "L" level. For this reason, a high-speed initial reset becomes possible without causing exposure unevenness in image, and thus it is possible to meet a high-speed mechanical shutter operation. Naturally, the period of "H" level of the vertical scanning signal φ VSR is not limited to the time duration shown in FIG. 10.

(Embodiment 3)

Figure 11:
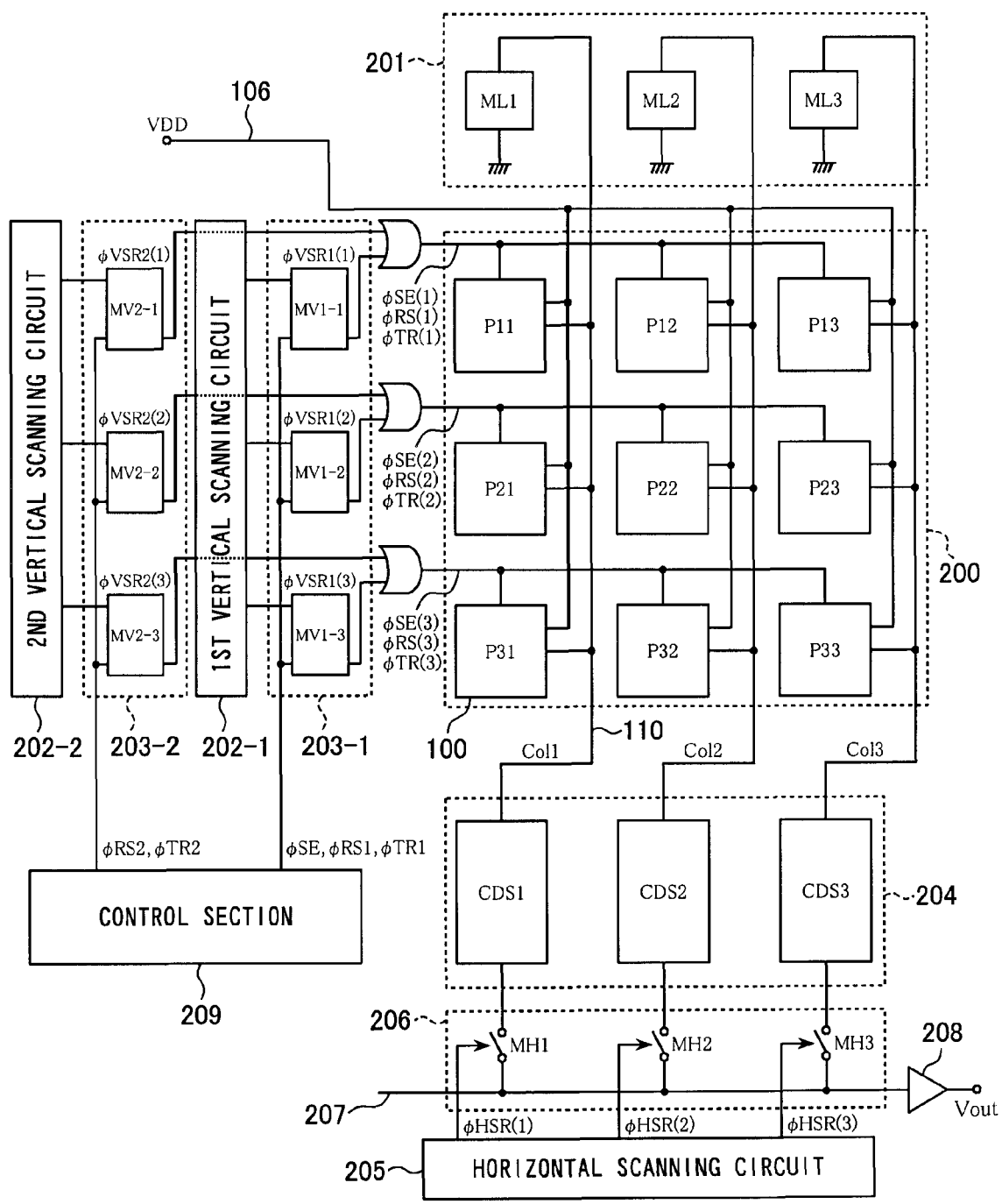
FIG. 11 is a block diagram showing an entire construction of the solid-state imaging apparatus according to a third embodiment.

A third embodiment of the invention will now be described by way of FIGS. 11, 12, 13, and 14. This embodiment also corresponds to the first to third aspects of the invention. The solid-state imaging apparatus according to the third embodiment is constructed so that an operation for taking moving picture can also be effected in addition to the still picture taking in the case where the solid-state imaging apparatus capable of generating a transfer signal from vertical scanning signal and of generating a reset signal by delaying the transfer signal is used in a digital camera. FIG. 11 shows the construction as a whole of the solid-state imaging apparatus according to the third embodiment. It is different from the first embodiment shown in FIG. 6 in that the vertical scanning circuit and the vertical selecting section are respectively provided in 2 units, i.e. a first vertical scanning circuit 202-1 and a second vertical scanning circuit 202-2, and a first vertical selecting section 203-1 and a second vertical selecting section 203-2. The first vertical scanning circuit 202-1 and the first vertical selecting section 203-1 are identical to those in the prior-art example previously shown in FIG. 2, and are to control signals to be used at the time of reading.

Figure 12:
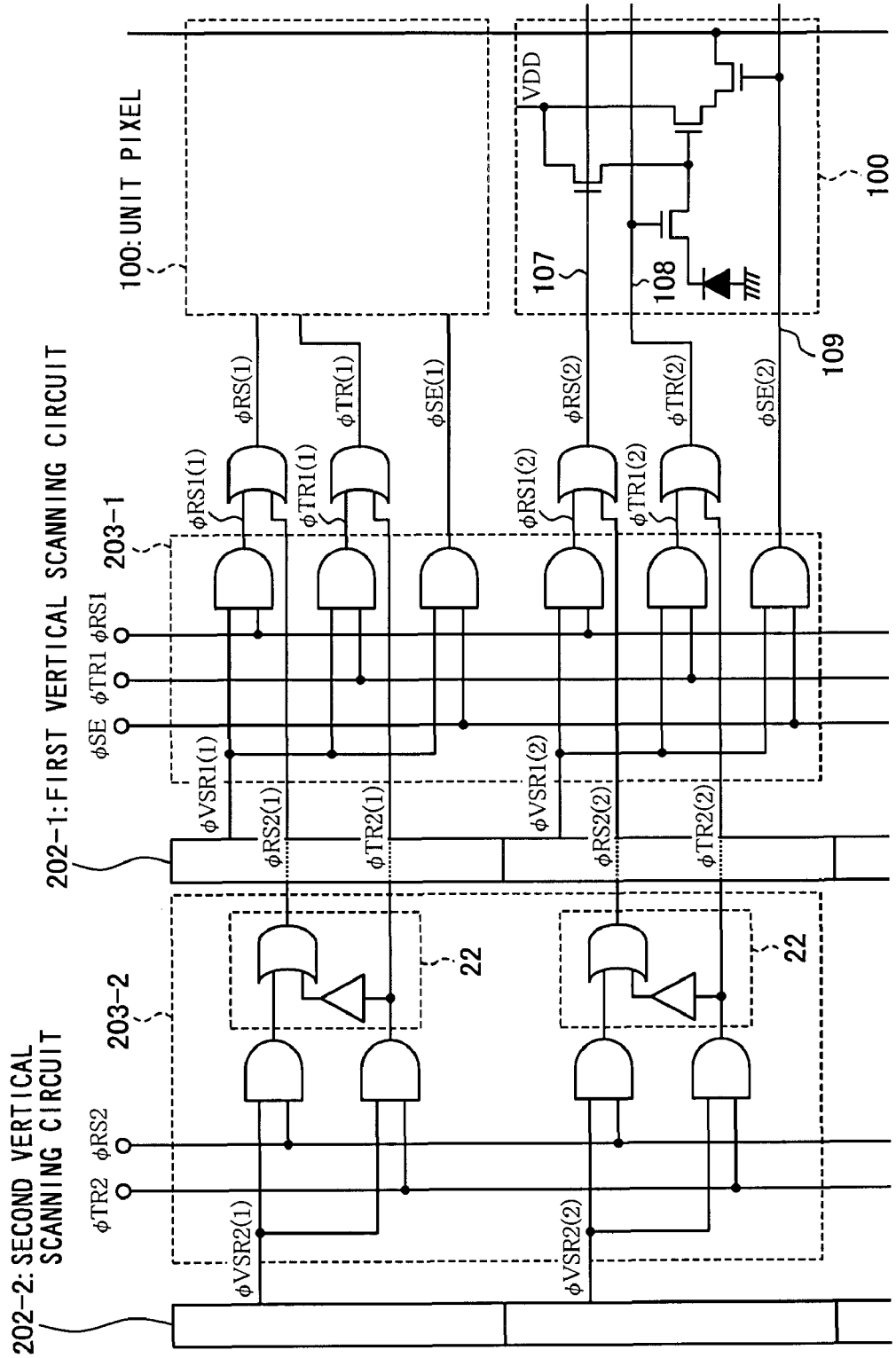
FIG. 12 is a circuit diagram showing a specific construction of the vertical select circuit in the third embodiment shown in FIG. 11.

In the second vertical selecting section 203-2 shown in FIG. 12, φ RS2 and φ TR2 are a row reset signal and a row transfer signal, respectively, which are to control signals used in reset. Signals φ SE, φ RS1, φ RS2, φ TR1, and φ TR2 inputted to the first and second vertical selecting section 203-1, 203-2 are controlled by a control section 209. A delay circuit 22 in the second vertical selecting section 203-2 has a construction as shown in FIG. 12 where the delay circuit control signal φ CTL is removed from the delay circuit 21 in the first embodiment shown in FIG. 7 and a buffer is placed instead of AND circuit. The construction of the delay circuit 22, however, is not limited to the above construction.

As shown in FIG. 12, a signal taking OR of reset signals of each row outputted respectively from the first vertical selecting section 203-1 and the second vertical selecting section 203-2 becomes the row reset signal of i-th row φ RS(i) (i=1, 2, 3), and a signal taking OR of transfer signals of each row respectively outputted from the first vertical selecting section 203-1 and the second vertical selecting section 203-2 becomes the row transfer signal of i-th row φ TR(i) (i=1, 2, 3). The above described reset signal φ RS(i) (i=1, 2, 3) and the row transfer signal φ TR(i) (i=1, 2, 3) are respectively connected to each row reset signal line 107 and each row transfer signal line 108 in a pixel section 200 consisting of pixels P11 to P33. In FIG. 11, while the lines for transmitting the row select signal φ SE(1), φ SE(2), φ SE(3), the row reset signal φ RS(1), φ RS(2), φ RS(3), and the row transfer signal φ TR(1), φ TR(2), φ TR(3) to each row is indicated by one solid line, and outputs of the first and second vertical select circuits (MV1-1, MV1-2, MV1-3, MV2-1, MV2-2, MV2-3) are indicated by one solid line for each one row, these in actual setting are respectively provided independently from each other. It should be noted that, while the row select signal φ SE(1), φ SE(2), φ SE(3) is not one taking OR of signals from the first and second vertical selecting section but is a signal coming from the first vertical selecting section alone, it is shown in FIG. 11 in a manner as outputted through OR circuit so as to facilitate illustration.

FIG. 12 as described above shows a specific construction of the vertical select circuits (MV1-1, MV1-2, MV1-3, MV2-1, MV2-2, MV2-3) of the first and second vertical selecting section 203-1, 203-2 in the third embodiment. The construction will now be described in more detail. Referring to FIG. 12, 202-1, and 202-2 are a first and a second vertical scanning circuits, and φ SE; φ RS1, φ RS2; and φ TR1, φ TR2 are a row select signal, row reset signals, and row transfer signals, respectively. The signals φ RS1(i) (i=1, 2, 3) and φ TR1(i) (i=1, 2, 3) outputted from the first vertical selecting section 203-1 are a signal taking AND of the first vertical scanning signal φ VSR1(i) (i=1, 2, 3) from the first vertical scanning circuit 202-1 and the row reset signal φ RS1, and a signal taking AND of the first vertical scanning signal φ VSR1(i) (i=1, 2, 3) and the row transfer signal φ TR1, respectively. Further, the signal φ SE(i) (i=1, 2, 3) outputted from the first vertical selecting section 203-1 is a signal taking AND of the first vertical scanning signal φ VSR1(i) (i=1, 2, 3) and the row select signal φ SE.

The signals φ RS2(i) (i=1, 2, 3) and φ TR2(i) (i=1, 2, 3) outputted from the second vertical selecting section 203-2 are a signal taking AND of the second vertical scanning signal φ VSR2(i) (i=1, 2, 3) from the second vertical scanning circuit 202-2 and the row reset signal φ RS2, and a signal taking AND of the second vertical scanning signal φ VSR2(i) (i=1, 2, 3) and the row transfer signal φ TR2, respectively.

The row reset signal φ RS(i) (i=1, 2, 3) to be transmitted to the row reset signal line 107 in the pixel section 200 is obtained as one taking OR of the signal φ RS1(i) (i=1, 2, 3) outputted from the first vertical selecting section 203-1 or the signal φ RS2(i) (i=1, 2, 3) outputted from the second vertical selecting section 203-2.

The row transfer signal φ TR(i) (i=1, 2, 3) to be transmitted to the row transfer signal line 108 in the pixel section 200 is obtained as one taking OR of the signal φ TR1(i) (i=1, 2, 3) outputted from the first vertical selecting section 203-1 or the signal φ TR2(i) (i=1, 2, 3) outputted from the second vertical selecting section 203-2.

An operation at the time of taking moving picture in the third embodiment will now be described by way of a timing chart shown in FIG. 13. While reset operation and read operation are consecutively effected row by row in the taking of moving picture, the reset operation is effected by the second vertical scanning circuit 202-2 and the second vertical selecting section 203-2 and the read operation is effected by the first vertical scanning circuit 202-1 and the first vertical selecting section 203-1. At the time of reset, the row reset signal φ RS2 is continuously at "L" level and the row transfer signal φ TR2 is continuously at "H" level. When the second vertical scanning signal of the first row φ VSR2(1) is outputted from the second vertical scanning circuit 202-2, the pixels of the first row are made drivable. When the second vertical scanning signal φ VSR2(1) attains "H" level, the transfer signal of the first row φ TR2(1) becomes a signal like the second vertical scanning signal φ VSR2(1) because the row transfer signal φ TR2 is at "H" level. Since the row reset signal φ RS2 is continuously at "L" level, the signal taking AND of the second vertical scanning signal φ VSR2(1) and the row reset signal φ RS2 attains "L" level.

Accordingly, since the reset signal of the first row φ RS2(1) outputted from the second vertical selecting section 203-2 becomes a signal taking OR of "L" level or the transfer signal of the first row φ TR2(1) outputted from the second vertical selecting section 203-2, it is a signal like the first row transfer signal φ TR2(1) outputted from the second vertical selecting section 203-2. The timing of the first row reset signal φ RS2(1) outputted from the second vertical selecting section 203-2, however, occurs as it is delayed correspondingly to the fact that it goes through the delay circuit 22 consisting of buffer and OR circuit as compared to the first row transfer signal φ TR2(1) outputted from the second vertical selecting section 203-2.

The reset signal of the first row φ RS(1) connected to the row reset line 107 in the pixel 100 is an OR of the reset signal of the first row φ RS2(1) outputted from the second vertical selecting section 203-2 or the reset signal of the first row φ RS1(1) outputted from the first vertical selecting section 203-1. Then, at the time of reset, since the first row reset signal φ RS1(1) outputted from the first vertical selecting section 203-1 is controlled by the control section 209 so that it is at "L" level, the first row reset signal φ RS(1) connected to the row reset line 107 becomes a signal like the first row reset signal φ RS2(1) outputted from the second vertical selecting section 203-2. An accumulation of photo-generated electric charge is started at the pixels of the first row from a point in time when the first row reset signal φ RS(1) is changed from "H" level to "L" level. The second row and after are treated in like manner.

At the time of reading, the first vertical scanning circuit 202-1 and the first vertical selecting section 203-1 operate similarly to the timings of the prior-art example shown in FIG. 4. At this time, the reset signal of the first row φ RS(1) is an OR of the reset signal of the first row φ RS1(1) outputted from the first vertical selecting section 203-1 or the reset signal of the first row φ RS2(1) outputted from the second vertical selecting section 203-2.

Then, in the read period, since the first row reset signal φ RS2(1) outputted from the second vertical selecting section 203-2 is controlled by the control section 209 so that it is at "L" level, the first row reset signal φ RS(1) connected to the row reset line 107 becomes a signal like the first row reset signal φ RS1(1) outputted from the first vertical selecting section 203-1. A reset level output outputted when the row reset signal φ RS1(1) is brought to "L" level is sampled at the column processing circuit section 204.

The transfer signal of the first row φ TR(1) connected to the row transfer line 108 in the pixel 100 is an OR of the transfer signal of the first row φ TR1(1) outputted from the first vertical selecting section 203-1 or the transfer signal of the first row φ TR2(1) outputted from the second vertical selecting section 203-2. Then, in the read period, since the first row transfer signal φ TR2(1) outputted from the second vertical selecting section 203-2 is controlled by the control circuit 209 so that it is at "L" level, the first row transfer signal φ TR1 connected to the row transfer line 108 becomes a signal like the first row transfer signal φ TR1(1) outputted from the first vertical selecting section 203-1. At the time of reading, the first row transfer signal φ TR(1) is driven to "H" level to transfer photo-generated electric charges accumulated at the photodiode 101 to the gate terminal of the amplification transistor 104. The row transfer signal of the first row φ TR(1) is then brought to "L" level so that a read processing is effected by sampling again at the column processing circuit section 204 a signal level output outputted at this time. The second row and after are treated in like manner. It should be noted that an exposure period from the resetting to the reading shown in the timing chart of FIG. 13 corresponds but otherwise is not limited to one row.

An operation at the time of taking still picture with using the first blind electronic shutter will next be described by way of a timing chart shown in FIG. 14. At first in the taking of still picture, a reset operation is effected by the second vertical scanning circuit 203-2. At the time of initial reset, the row reset signal φ RS2 is continuously at "L" level and the row transfer signal φ TR2 is continuously at "H" level. When the second vertical scanning signal of the first row φ VSR2(1) is outputted from the second vertical scanning circuit 202-2, the pixels of the first row are made drivable. When the second vertical scanning signal φ VSR2(1) attains "H" level, the transfer signal of the first row φ TR2(1) becomes a signal like the second vertical scanning signal φ VSR2(1) because the row transfer signal φ TR2 is at "H" level. Since the row reset signal φ RS2 is continuously at "L" level, the signal taking AND of the second vertical scanning signal φ VSR2(1) and the row reset signal φ RS2 attains "L" level.

Accordingly, since the reset signal of the first row φ RS2(1) outputted from the second vertical selecting section 203-2 becomes a signal taking OR of "L" level or the transfer signal of the first row φ TR2(1) outputted from the second vertical selecting section 203-2, it becomes a signal like the first row transfer signal φ TR2(1) outputted from the second vertical selecting section 203-2. The timing of the first row reset signal φ RS2(1) outputted from the second vertical selecting section 203-2, however, occurs as it is delayed correspondingly to the fact that it goes through the delay circuit 22 consisting of buffer and OR circuit as compared to the transfer signal of the first row φ TR2(1) outputted from the second vertical selecting section 203-2.

The reset signal of the first row φ RS(1) connected to the row reset line 107 in the pixel 100 is an OR taken from the reset signal of the first row φ RS2(1) outputted from the second vertical selecting section 203-2 or the reset signal of the first row φ RS1(1) outputted from the first vertical selecting section 203-1. Then, at the time of reset, since the first row reset signal φ RS1(1) outputted from the first vertical selecting section 203-1 is controlled by the control section 209 so that it is at "L" level, the first row reset signal φ RS(1) connected to the row reset line 107 becomes a signal like the first row reset signal φ RS2(1) outputted from the second vertical selecting section 203-2. An accumulation of photo-generated electric charge is started at the pixels of the first row from the point in time when the first row reset signal φ RS(1) is changed from "H" level to "L" level. The second row and after are treated in like manner. Subsequently, after passage of a desired time, the exposure is ended by the mechanical shutter.

A read operation is then effected by causing the first vertical scanning circuit 203-1 alone to operate. At the time of reading, the first vertical scanning circuit 202-1 and the first vertical selecting section 203-1 operate similarly to the timing in the prior-art example shown in FIG. 4. At this time, the reset signal of the first row φ RS(1) is an OR taken from the reset signal of the first row φ RS1(1) outputted from the first vertical selecting section 203-1 or the reset signal of the first row φ RS2(1) outputted from the second vertical selecting section 203-2.

Then, in the read period, since a control is effected by the control section 209 so that the first row reset signal φ RS2(1) outputted from the second vertical selecting section 203-2 attains "L" level, the first row reset signal φ RS(1) connected to the row reset line 107 is obtained as a signal like the first row reset signal φ RS1(1) outputted from the first vertical selecting section 203-1. A reset level output outputted when the row reset signal φ RS1(1) is brought to "L" level is sampled at the column processing circuit section 204.

The transfer signal of the first row φ TR(1) connected to the row transfer line 108 in the pixel 100 is an OR taken from the transfer signal of the first row φ TR1(1) outputted from the first vertical selecting section 203-1 or the transfer signal of the first row φ TR2(1) outputted from the second vertical selecting section 203-2.

Then, in the read period, since a control is effected by the control section 209 so that the first row transfer signal φ TR2(1) outputted form the second vertical selecting section 203-2 attains "L" level, the first row transfer signal φ TR1(1) connected to the row transfer line 108 becomes a signal like the first row transfer signal φ TR1(1) outputted from the first vertical selecting section 203-1.

At the time of reading, the first row transfer signal φ TR(1) is driven to "H" level to transfer photo-generated electric charges accumulated at the photodiode 101 to the gate terminal of the amplification transistor 104. The transfer signal of the first row φ TR(1) is then brought to "L" level so that read processing is effected by sampling again at the column processing circuit section 204 a signal level output outputted at this time. The second row and after are treated in like manner.

Figure 13:
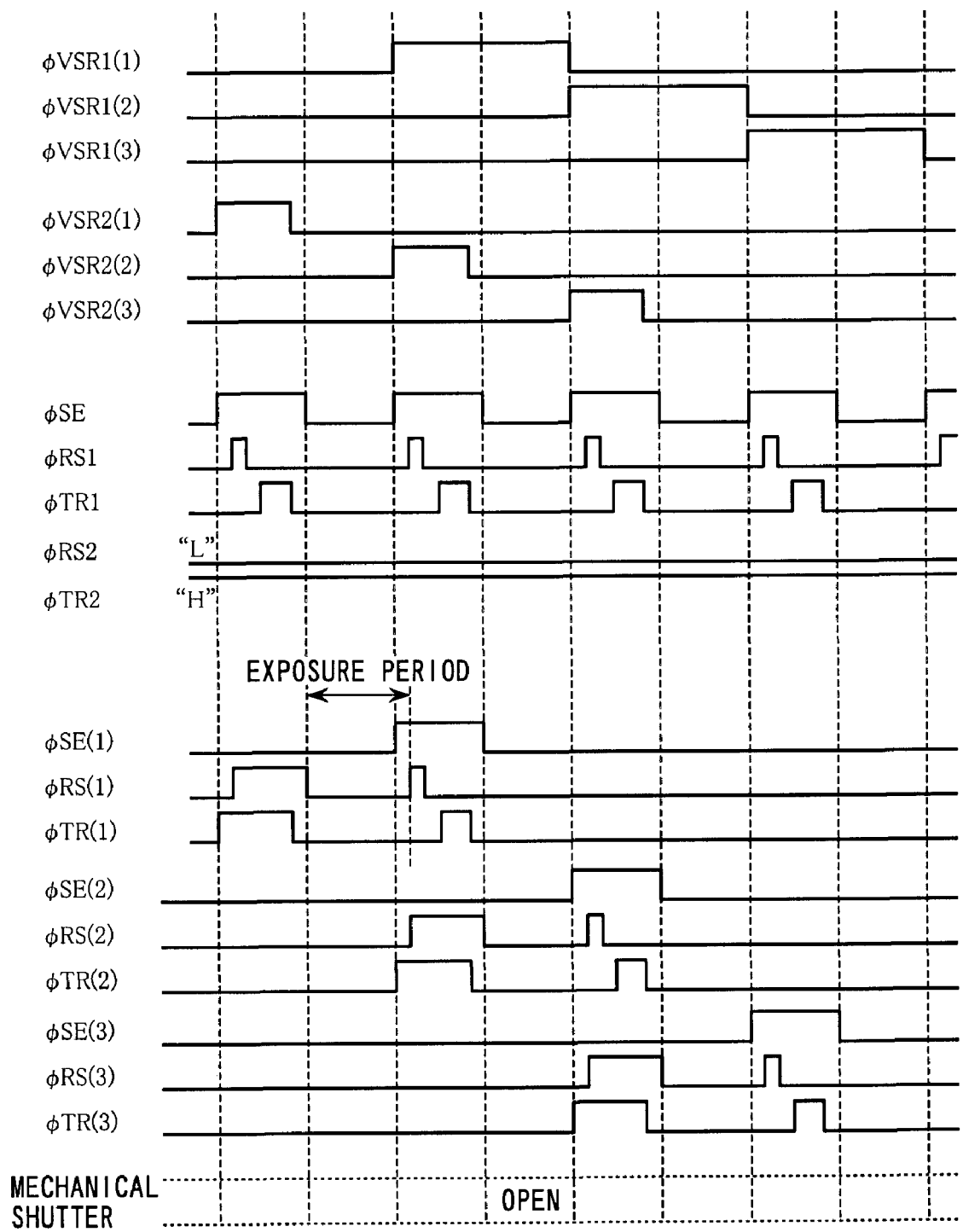
FIG. 13 is a timing chart for explaining an operation at the time of taking moving picture in the third embodiment shown in FIGS. 1 and 12.
Figure 14:
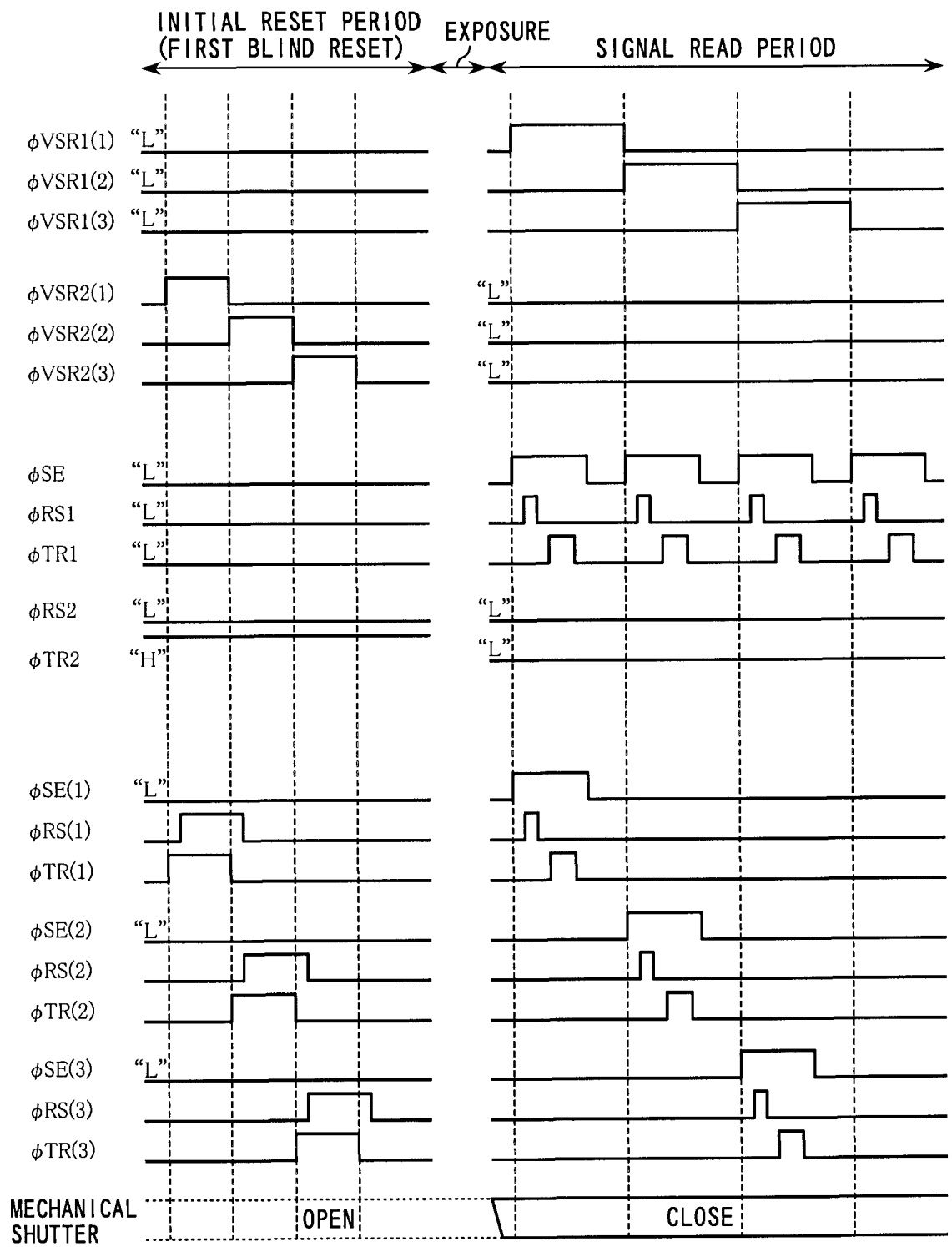
FIG. 14 is a timing chart for explaining an operation at the time of taking still picture with using a first blind electronic shutter in the third embodiment.

With the solid-state imaging apparatus according to the third embodiment having circuit construction as shown above in FIGS. 11 and 12, the operation shown in the timing charts in FIGS. 13 and 14 is effected, whereby a high-speed mechanical shutter operation can be met in still picture taking without causing exposure unevenness in image and at the same time with making a high-speed initial reset possible, and taking of moving picture is also made possible.

According to the first and second aspects of the invention as has been described by way of the above embodiments, it is not necessary to take timing margin into consideration by generating the row transfer signal and the row reset signal from the vertical scanning signal; and at this time, since the row reset signal is generated with delaying the falling of the row transfer signal, the row reset signal attains "L" level as it is delayed from the row transfer signal so that reset operation is more securely effected. Accordingly, it is possible to achieve a solid-state imaging apparatus where the speed of an initial reset operation in the vertical direction can be increased so as to meet a high-speed mechanical shutter operation. Further, according to the third aspect of the invention, since it is not necessary to take timing margin into consideration similarly to the first and second aspects, a high speed reset operation can be rendered at the time of an initial reset operation in still picture taking.

What is claimed is:

1. A solid-state imaging apparatus comprising: a pixel section having two-dimensionally arranged pixels each containing a photoelectric conversion device for converting a light signal into a signal electric charge and accumulating said signal electric charge, an amplification means for amplifying and outputting as a pixel signal the signal electric charges accumulated at the photoelectric conversion device, a transfer means for transferring the accumulated signal electric charges to said amplification means, and a reset means for resetting said signal electric charges;
    a vertical scanning section for outputting a vertical scanning signal to drive the pixel section row by row; and
    a vertical selecting section for generating a row transfer signal in accordance with said vertical scanning signal to drive said transfer means and for generating a row reset signal that is delayed by a predetermined amount from said row transfer signal to drive said reset means.

2. A solid-state imaging apparatus comprising:

a pixel section having two-dimensionally arranged pixels each containing a photoelectric conversion device for converting a light signal into a signal electric charge and accumulating said signal electric charge, an amplification means for amplifying and outputting as a pixel signal the signal electric charges accumulated at the photoelectric conversion device, a transfer means for transferring the accumulated signal electric charges to said amplification means, and a reset means for resetting said signal electric charges;

a vertical scanning section for outputting a vertical scanning signal to drive the pixel section row by row;

a vertical selecting section for generating a row transfer signal in accordance with said vertical scanning signal to drive said transfer means and for generating a row reset signal that is delayed by a predetermined amount from said row transfer signal to drive said reset means; and a control section for effecting a control so that said row transfer signal and said row reset signal are generated at the time of said initial reset operation, wherein a still image taking is performed with the step of sequentially outputting said pixel signal row by row after passage of a desired exposure period subsequently to an initial reset operation where reset operation alone is sequentially performed row by row of the pixels in said pixel section.

* * * * *